United States Patent
Liu

(10) Patent No.: US 11,109,331 B2
(45) Date of Patent: Aug. 31, 2021

(54) METHOD AND APPARATUS FOR TRANSMITTING AND ACQUIRING SYNCHRONIZATION INFORMATION BLOCK

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 107 days.

(21) Appl. No.: 16/586,918

(22) Filed: Sep. 28, 2019

(65) Prior Publication Data
US 2020/0029289 A1   Jan. 23, 2020

Related U.S. Application Data

(63) Continuation of application No. PCT/CN2017/078439, filed on Mar. 28, 2017.

(51) Int. Cl.
*H04W 56/00* (2009.01)
*H04W 72/00* (2009.01)
(Continued)

(52) U.S. Cl.
CPC ....... *H04W 56/001* (2013.01); *H04W 72/005* (2013.01); *H04W 72/046* (2013.01); *H04W 74/0833* (2013.01)

(58) Field of Classification Search
CPC ... H04W 56/001; H04W 48/10; H04W 48/12; H04W 56/00; H04W 56/0015;
(Continued)

(56) References Cited

U.S. PATENT DOCUMENTS

| 6,556,639 B1 | 4/2003 | Goldston et al. |
| 2011/0058528 A1 | 3/2011 | Chang et al. |
| (Continued) | | |

FOREIGN PATENT DOCUMENTS

| CN | 1358367 A | 7/2002 |
| CN | 101771439 A | 7/2010 |
| (Continued) | | |

OTHER PUBLICATIONS

Sheng et al. U.S. Appl. No. 62/454,016, filed Feb. 2, 2017 (Year: 2017).*

(Continued)

*Primary Examiner* — Wutchung Chu
(74) *Attorney, Agent, or Firm* — Syncoda LLC; Feng Ma

(57) ABSTRACT

A method and for transmitting and acquiring synchronization information blocks includes: determining target mode index information according to a preset synchronization information block burst set (SS burst set) mode; storing the target mode index information in each synchronization information block to acquire the target synchronization information blocks to be transmitted; periodically transmitting the target synchronization information blocks to user equipment (UE) in a target cell using high frequency beams; where each of the SS burst sets includes a first preset number of synchronization signal bursts (SS bursts) that are periodically transmitted; and each of the SS bursts includes a second preset number of target synchronization information blocks that are transmitted in a spatial sequence.

20 Claims, 11 Drawing Sheets

(51) Int. Cl.
*H04W 72/04* (2009.01)
*H04W 74/08* (2009.01)

(58) Field of Classification Search
CPC ............. H04W 72/005; H04W 72/046; H04W 74/0833; H04B 7/2678
See application file for complete search history.

(56) References Cited

U.S. PATENT DOCUMENTS

| | | | | |
|---|---|---|---|---|
| 2013/0185462 | A1 | 7/2013 | Manabe | |
| 2018/0084593 | A1* | 3/2018 | Chen | H04L 5/0048 |
| 2018/0123849 | A1* | 5/2018 | Si | H04J 11/0073 |
| 2018/0198659 | A1* | 7/2018 | Ko | H04L 27/2662 |
| 2018/0220360 | A1* | 8/2018 | Sheng | H04L 27/2692 |
| 2018/0227867 | A1* | 8/2018 | Park | H04W 56/001 |
| 2018/0242324 | A1* | 8/2018 | Luo | H04L 5/0044 |
| 2018/0248642 | A1* | 8/2018 | Si | H04L 5/0092 |
| 2018/0279241 | A1* | 9/2018 | Lee | H04W 56/001 |
| 2019/0058620 | A1* | 2/2019 | Liu | H04L 5/0053 |
| 2019/0123951 | A1* | 4/2019 | Wang | H04L 25/03872 |
| 2019/0200306 | A1* | 6/2019 | Ko | H04B 7/0617 |
| 2019/0289639 | A1* | 9/2019 | Frenger | H04W 48/12 |
| 2019/0349068 | A1* | 11/2019 | Li | H04L 5/0048 |
| 2019/0373570 | A1* | 12/2019 | Yokomakura | H04W 72/04 |
| 2021/0007072 | A1* | 1/2021 | Wu | H04W 56/001 |

FOREIGN PATENT DOCUMENTS

| | | |
|---|---|---|
| CN | 102217264 A | 10/2011 |
| EP | 2159926 A1 | 3/2010 |

OTHER PUBLICATIONS

Park et al. KR20170016589 filed on Feb. 7, 2017 (Year: 2017).*
ISA State Intellectual Property Office of the People's Republic of China, International Search Report Issued in Application No. PCT/CN2017/078439, dated Sep. 21, 2017, WIPO, 4 pages.
"Study on New Radio (NR) Access Technology" 3GPP TR 38. 912 VI.0.0, Mar. 16, 2017 (Mar. 16, 2017), section 8.2.2.3.1.
ISA State Intellectual Property Office of the People's Republic of China, Written Opinion of the International Searching Authority Issued in Application No. PCT/CN2017/078439, dated Sep. 21, 2017, WIPO, 4 pages.
State Intellectual Property Office of the People's Republic of China, Office Action and Search Report Issued in Application No. 201780000184.3, dated Oct. 12, 2019, 15 pages,(Submitted with Machine Translation).
European Patent Office, Extended European Search Report Issued in Application No. 17903177.8 , dated Mar. 9, 2020, Germany, 9 pages.
Nokia et al; "On Requirements and Design of SS Burst Set and SS Block Index Indication", 3GPP TSG-RAN WG1 Meeting #88, R1-1703092, Feb. 13-17, 2017, 16 pages.
Nokia et al; "SS Bandwidth Numerology and Multiplexing", 3GPP TSG-RAN WG1 NR AH Meeting, R1-1701056, Jan. 16-20, 2017, 8 pages.
3gpp; "3rd Generation partnership Project"; Technical Specification Group Radio Access Network; Study on New Radio(NR) Access Technology, 3GPP TR 38.912 V1.0.0, Mar. 2017, 74 pages.
Huawei, HiSilicon; "NR Primary and Secondary Synchronization Signals Design", 3GPP TSG RAN WG1 Meeting #87, R1-1611261, Nov. 14-18, 2016, 10 pages.
InterDigital Communications; "Considerations on SS Burst Design and Indication", 3GPP TSG RAN WG1 Meeting #88, R1-1702315, Feb. 13-17, 2017, 6 pages.
Qualcomm Incorporated; "SS burst composition and time index indication considerations",3GPP TSG-RAN WG1 NR#88, R1-1702585, Feb. 13-17, 2017, 6 pages.
Ericsson; "NR System information distribution-principles and example", 3GPP TSG-RAN WG2 #95bis, Tdoc R2-166773, Oct. 10-14, 2016, 6 pages.
Huawei Hisilicon NTT Docomo, ZTE, 3GPP TSG RAN WG1 NR Ad Hoc Meeting Spokane, USA, R1-1701377, Jan. 16-20, 2017, 4 pages.
CATT; "NR Initial Access Procedure with multi-stage synchronization signals", 3GPP TSG RAN WG1 Meeting #87, R1-1611374, Nov. 14-18, 2016, 6 pages.

* cited by examiner

METHOD AND APPARATUS FOR TRANSMITTING AND ACQUIRING SYNCHRONIZATION INFORMATION BLOCK

CROSS-REFERENCE TO RELATED APPLICATIONS

The present application is a continuation of, and claims priority to, PCT Application No. PCT/CN2017/078439 filed on Mar. 28, 2017, the disclosure of which is hereby incorporated by reference in its entirety.

BACKGROUND

Prior to requesting access to a cell of a network, user equipment (UE) typically needs to receive primary and secondary synchronization signals sent by a base station to perform signal synchronization. After the synchronization succeeds, the UE further receives and analyze system information of the cell sent by the base station to perform system configuration, as preparations for a random access to the network.

In a long-term evolution (LTE) network communication system, the base station transmits the synchronization signal with a fixed period. After the first synchronization succeeds, the UE estimates the reception time of subsequent synchronization signals on the basis of the fixed transmission period of the synchronization signal, thereby accurately performing the signal synchronization.

SUMMARY

The present disclosure relates generally to the field of communications technologies, and more specifically to a method and an apparatus for transmitting and acquiring synchronization information blocks.

Various embodiments of the present disclosure provide a method and an apparatus for transmitting and acquiring synchronization information blocks, such that UE in 5G network can perform signal synchronization quickly and accurately.

According to a first aspect of the examples of the present disclosure, a method of transmitting synchronization signal blocks is provided, which is applied to a base station and includes:

determining target mode index information according to a preset synchronization information block burst set (SS burst set) mode;

storing the target mode index information in each synchronization information block (SS block) to acquire target synchronization information blocks to be transmitted; and periodically transmitting the target synchronization information blocks to user equipment in a target cell using high frequency beams;

where each of the SS burst sets includes a first preset number of synchronization signal bursts (SS bursts) that are periodically transmitted; and each of the SS bursts includes a second preset number of the target synchronization information blocks that are transmitted in a spatial sequence.

In some embodiments, determining the target mode index information according to the preset SS burst set mode includes:

querying a pre-configured index information list according to the preset SS burst set mode to acquire mode index information corresponding to the preset SS burst set mode.

In some embodiments, storing the target mode index information in each synchronization information block (SS block) to acquire the target synchronization information blocks are performed in any of the following manners:

storing the target mode index information in a physical broadcast channel (PBCH) of each synchronization information block in the SS burst set of the preset mode;

storing the target mode index information in other channels of each synchronization information block in the SS burst set of the preset mode; and storing the target mode index information in a designated position of the PBCH of each synchronization information block in the SS burst set of the preset mode.

In some embodiments, before determining the target mode index information according to the preset SS burst set mode, the method further includes:

determining a mode of a SS burst set to be transmitted according to target cell information.

In some embodiments, determining the mode of the SS burst set to be transmitted according to the target cell information includes:

acquiring the target cell information, where the target cell information includes at least one of the following: an identifier of the cell, a user equipment type in the cell, and service busyness of the cell; and determining the mode of SS burst set suitable for the target cell according to the target cell information.

According to a second aspect of the examples of the present disclosure, a method of acquiring synchronization information blocks is provided, which applied to UE and including:

detecting a synchronization information block carried by a high frequency beam according to a preset initial detection window;

acquiring mode index information of an SS burst set from the detected synchronization information block;

determining expected arrival times of subsequent synchronization information blocks according to the mode index information; and during subsequent signal synchronization processes, acquiring target synchronization information blocks according to the expected arrival times.

In some embodiments, acquiring the mode index information of the SS burst set from the detected synchronization information block includes:

after detecting a first synchronization information block, acquiring the mode index information of the SS burst set from the synchronization information block.

In some embodiments, acquiring the mode index information of the SS burst set from the detected synchronization information block includes:

analyzing a piece of the mode index information from each of a preset quantity of the detected synchronization information blocks; and determining identical pieces of the mode index information among the preset quantity of the mode index information as valid mode index information.

In some embodiments, determining the expected arrival times of the subsequent synchronization information blocks according to the mode index information includes:

determining a time interval of two adjacent synchronization information blocks according to the mode index information; and determining the expected arrival times of the subsequent synchronization information blocks according to a reception time of current synchronization information block and the time interval of two adjacent synchronization information blocks.

According to a third aspect of the examples of the present disclosure, an apparatus for transmitting synchronization information blocks is provided, which applied to a base station and including:

a mode index determining module, configured to d target mode index information according to a preset SS burst set mode;

a storing module, configured to store the target mode index information in each SS block to acquire target synchronization information blocks to be transmitted; and a transmitting module, configured to periodically transmit the target synchronization information blocks to user equipment in a target cell using high frequency beams;

where each of the SS burst sets includes a first preset number of SS bursts that are periodically transmitted; and each of the SS bursts includes a second preset number of the target synchronization information blocks that are transmitted in a spatial sequence.

In some embodiments, the mode index determining module includes:

a mode index determining sub-module, configured to query a pre-configured index information list according to the preset SS burst set mode to acquire mode index information corresponding to the preset SS burst set mode.

In some embodiments, the storing module includes any one of the following sub-modules:

a first storing sub-module, configured to store the target mode index information in a PBCH of each synchronization information block in the SS burst set of the preset mode;

a second storing sub-module, configured to store the target mode index information in other channels of each synchronization information block in the SS burst set of the preset mode; and a third storing sub-module, configured to store the target mode index information in a designated position of the PBCH of each synchronization information block in the SS burst set of the preset mode.

In some embodiments, the apparatus for transmitting synchronization information blocks further includes:

a mode determining module, configured to determine a mode of a SS burst set to be transmitted according to target cell information.

In some embodiments, the mode determining module includes:

a cell information acquiring sub-module, configured to acquire the target cell information, where the target cell information includes at least one of the following: an identifier of the cell, a user equipment type in the cell, and service busyness of the cell; and a mode determining sub-module, configured to determine the mode of SS burst set suitable for the target cell according to the target cell information.

According to a fourth aspect of the examples of the present disclosure, an apparatus for acquiring synchronization information blocks is provided, which applied to UE and including:

an initial detecting module, configured to detect a synchronization information block carried by a high frequency beam according to a preset initial detection window;

an index information acquiring module, configured to acquire mode index information of an SS burst set from the detected synchronization information block;

a time predicting module, configured to determine expected arrival times of subsequent synchronization information blocks according to the mode index information; and a synchronization signal acquiring module, configured to acquire, during subsequent signal synchronization processes, target synchronization information blocks according to the expected arrival times.

In some embodiments, the index information acquiring module includes:

a first acquiring sub-module, configured to acquire, after detecting a first synchronization information block, the mode index information of the SS burst set from the synchronization information block.

In some embodiments, the index information acquiring module includes:

a synchronization block acquiring sub-module, configured to analyze a piece of the mode index information from each of a preset quantity of the detected synchronization information blocks; and a second acquiring sub-module, configured to determine identical pieces of the mode index information among the preset quantity of the mode index information as valid mode index information.

In some embodiments, the time predicting module includes:

a time interval determining sub-module, configured to determine a time interval of two adjacent synchronization information blocks according to the mode index information; and a time pre-calculating sub-module, configured to determine the expected arrival times of the subsequent synchronization information blocks according to a reception time of current synchronization information block and the time interval of two adjacent synchronization information blocks.

According to a fifth aspect of the examples of the present disclosure, an apparatus for transmitting synchronization information blocks is provided, including: a processor; a memory for storing processor executable instructions; where the processor is configured to:

determine target mode index information according to a preset SS burst set mode;

store the target mode index information in each SS block to acquire target synchronization information blocks to be transmitted; and periodically transmit the target synchronization information blocks to user equipment in a target cell using high frequency beams;

where each of the SS burst sets includes a first preset number of SS bursts that are periodically transmitted; and each of the SS bursts includes a second preset number of the target synchronization information blocks that are transmitted in a spatial sequence.

According to a sixth aspect of the examples of the present disclosure, an apparatus for acquiring synchronization information blocks is provided, including: a processor; a memory for storing processor executable instructions; where the processor is configured to:

detect a synchronization information block carried by a high frequency beam according to a preset initial detection window;

acquire mode index information of an SS burst set from the detected synchronization information block;

determine expected arrival times of subsequent synchronization information blocks according to the mode index information; and acquire, during subsequent signal synchronization processes, target synchronization information blocks according to the expected arrival times.

Various embodiments of the present disclosure can have one or more of the following advantages.

In some embodiments of the present disclosure, when broadcasting synchronization information blocks to UE in a target cell, a base station in 5G network stores in every synchronization information block the mode index information corresponding to an SS burst set mode which the base station adopts. The base station broadcasts synchronization signals to the UE with high frequency beams carrying target synchronization information blocks. After acquiring a synchronization information block, the UE in the cell acquires the mode index information from the synchronization information block, learns the manner in which the base station broadcasts synchronization information blocks, and then accurately calculates expected arrival times of subsequent synchronization information blocks. In this way, in subsequent processes of signal synchronization with the cell, the UE is only required to open the synchronization signal detection window to acquire the target synchronization information blocks according to the expected arrival times, which not only makes the acquisition of the synchronization information blocks quick and accurate, but also reduces the power consumption of the equipment.

In some embodiments of the present disclosure, after determining a preset SS burst set mode for a target cell, the base station queries a pre-configured list of index information by using the mode of the preset SS burst set, and acquires the mode index information corresponding to the preset SS burst set mode. By querying a list, the mode index information is quickly acquired.

In some embodiments of the present disclosure, the base station can store the mode index information in a PBCH or other channels of each synchronization information block, or a designated position thereof, so that the UE can quickly acquire the mode index information according to the mode information storage protocol, thereby improving the signal synchronization efficiency of the UE.

In some embodiments of the present disclosure, when a cell requests signal coverage of a base station, the base station can first determine a suitable mode of an SS burst set to be transmitted to the target cell according to cell information of the target cell, thereby effectively utilizing radio resources.

In some embodiments of the present disclosure, when choosing the mode of the SS burst set to be transmitted to the target cell, the base station can take into account comprehensively an identifier of the cell, UE type(s) in the cell, service busyness of the cell, and the like. Then the base station can choose the one most appropriate for the target cell, so that radio resources are effectively utilized, waste of resources is avoided, and the power consumption of the base station is reduced. The methods for transmitting and acquiring synchronization information blocks provided in the present disclosure enable UE in 5G system performs cell signal synchronization quickly and accurately.

The above general description and the following detailed description are intended to be illustrative and explanatory, and not to be limiting of the present disclosure.

BRIEF DESCRIPTION OF THE DRAWINGS

The accompanying drawings, incorporated in and constitute part of the specification, illustrate examples of the present disclosure, and serve to explain the principles of the present disclosure in conjunction with the specification.

DETAILED DESCRIPTION

Figure 1A:
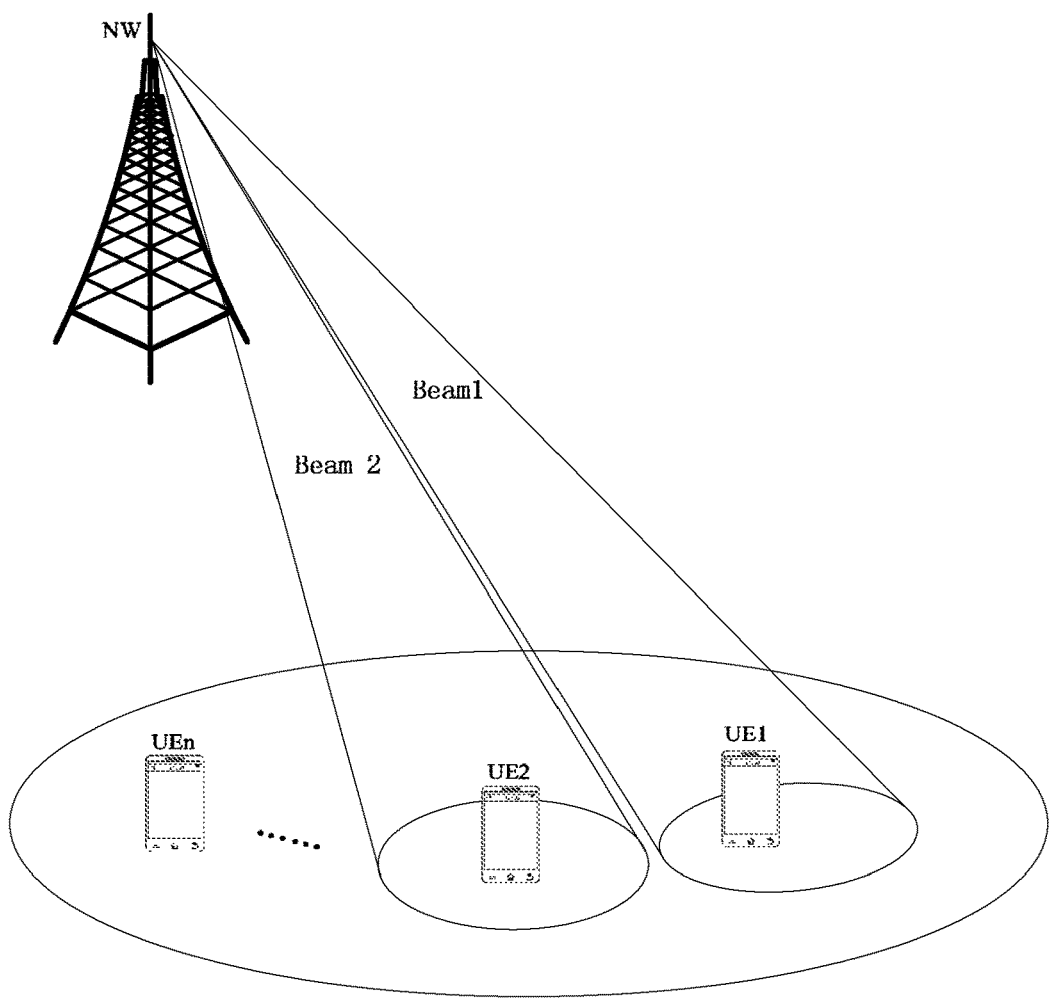
FIG. 1A is a schematic diagram illustrating high frequency beam sweeping in a 5G system according to an example of the present disclosure.

Examples will be described in detail herein, with illustrations thereof represented in the drawings. When the following descriptions involve the drawings, like numerals in different drawings represent like or similar elements unless otherwise indicated. The embodiments described in the following examples do not represent all embodiments consistent with the present disclosure. Instead, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a," "the" and "said" in their singular forms in the present disclosure and the appended claims are also intended to include plurality, unless clearly indicated otherwise in the context. It should also be understood that the term "and/or" as used herein refers to and encompasses any and all possible combinations of one or more of the associated listed items.

It is to be understood that although terms "first," "second," "third," etc. may be used in the present disclosure to describe various information, such information should not be limited to these terms. These terms are only used to distinguish one type of information from another within a category. For example, without departing from the scope of the present disclosure, first information may be referred as second information; and similarly, second information may also be referred as first information. Depending on the context, the word "if" as used herein may be interpreted as "when" or "upon" or "in response to determining."

In a 5G network communication system, the design of the synchronization signal has not been determined, or in other words, the mode in which the base station transmits synchronization signals in 5G network may not be fixed, and the UE cannot quickly and accurately detect the synchronization signal.

The technical solution provided by the present disclosure is applicable to 5G network, or any other network communication systems that uses high frequency beams for information transmission. The high frequency beam is, for example, a beam with a frequency point of 6 GHz or higher. The executive body involved in the present disclosure includes a transmitting end and a receiving end of the high frequency beam. The transmitting end of the high frequency beam can be a base station, a sub base station, or the like, provided with a large-scale antenna array. The receiving end of the high frequency beam is, for example, user equipment (UE) provided with a smart antenna array. The UE is, for example, a user terminal, a user node, a mobile terminal, or a tablet computer. In a specific implementation process, the base station and the UE are independent from and in contact with each other to jointly implement the technical solution provided by the present disclosure.

Before introducing the technical solutions of the present disclosure, it is necessary to know a method of information transmission of an LTE system in 5G and several concepts around synchronization signal transmission related to the present disclosure.

Standardization with 5G, i.e., new radio (NR) network is being carried out in the 3rd Generation Partnership Project (3GPP). One of the key technologies of the 5G network communication system is beamforming technology. When the base station NW (NetWork) broadcasts downlink synchronization signals and necessary system information, a method of beam sweeping is adopted in the 5G high-frequency system, in which a cell is fully covered by a quick sweep with concentrated power, as shown in FIG. 1A. FIG. 1A is a schematic diagram illustrates the high frequency beam sweeping in the 5G system according to an example.

In 5G system, regarding the transmission of the synchronization signal, three concepts are defined: synchronization information block (i.e., SS block), synchronization signal burst (i.e., SS burst), and synchronization signal burst set (i.e., SS burst set).

An SS block includes a Primary Synchronization Signal (PSS) and a Secondary Synchronization Signal (SSS). The SS block is loaded into a high frequency beam to form an SS block beam. The base station uses SS block beams to perform beam sweeping on the UE in a cell covered by signals of the base station, and broadcasts synchronization information to the UE in the cell through a downlink. After receiving and analyzing the synchronization information block, the UE performs signal synchronization with the cell of a network to prepare itself for accessing the cell of the network.

Figure 1B:
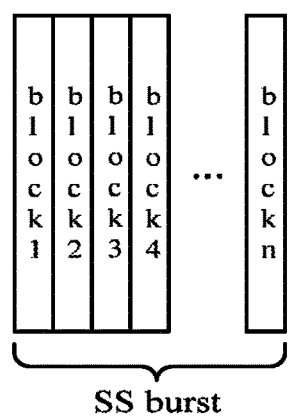
FIG. 1B is a schematic diagram illustrating a structure of an SS burst according to an example of the present disclosure.

An SS burst refers to a preset quantity of SS block beams required to be transmitted sequentially and directionally by a base station, so that all UE with a certain working frequency band in a cell is swept by the SS block beams during a beam sweeping process. FIG. 1B is a schematic diagram illustrating a structure of an SS burst according to an example. As shown in FIG. 1B, the SS burst can be seen as a group of the SS block beams, each of which carries one SS block. The quantity of the SS block beams included in one SS burst is related to a transmission angle of a single beam, that is, a coverage area of the single beam. Every SS block beam in an SS burst has the same frequency band.

In the 5G system, the SS burst is transmitted periodically, in other words, the base station does not transmit SS bursts continuously, but transmit an SS burst every preset interval. For example, after an SS burst transmission is completed, another SS burst transmission starts after a 5 ms interval is passed. In an example of the present disclosure, the interval between two adjacent SS bursts can be represented by SS burst transmission period T1, and then in the above example, T1=5 ms.

Because a base station may need to implement that UE with different working frequency bands in a 5G system is all swept by SS block beams, a plurality of SS bursts are to be transmitted, according to the interval between every two adjacent SS bursts (also known as the SS burst transmission period T1), an SS burst set is determined, and the SS burst set corresponds a duration, which can be represented as T0. In other words, the duration of the SS burst set relates to the type(s) of frequency bands specified in the 5G system and the foregoing SS burst transmission period T1.

Figure 1C:
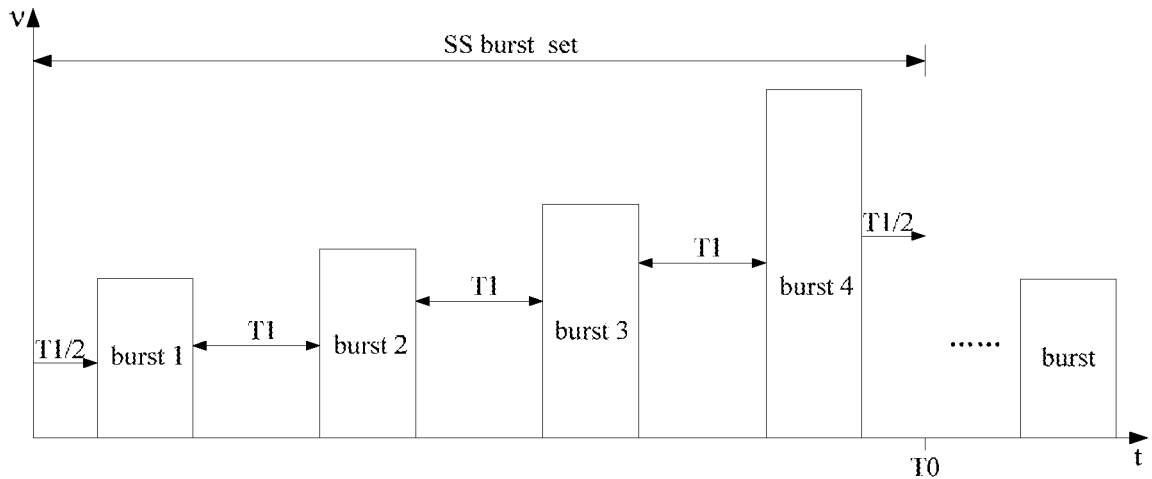
FIG. 1C is a schematic diagram illustrating a structure of an SS burst set according to an example of the present disclosure.

It is assumed that the 5G system specifies four frequency bands: 6 GHz, 8 GHz, 10 GHz, and 50 GHz; and specifies the SS burst transmission period T1 in the SS burst set is 5 ms, that is, the interval between two adjacent SS bursts is 5 ms. In a case that the time spent during the transmission of an SS burst is neglected (compared to the SS burst transmission period T1, an SS burst is transmitted within a very short time, possibly a few micro second, which is negligible), the duration of an SS burst set is equivalent to four SS burst transmission periods, that is 20 ms. FIG. 1C is a schematic diagram illustrating a structure of an SS burst set according to an example. As shown in FIG. 1C, under the SS burst set mode, the frequency bands of Burst 1, Burst 2, Burst 3 and Burst 4 are different, each larger than its predecessor.

Figure 1D:
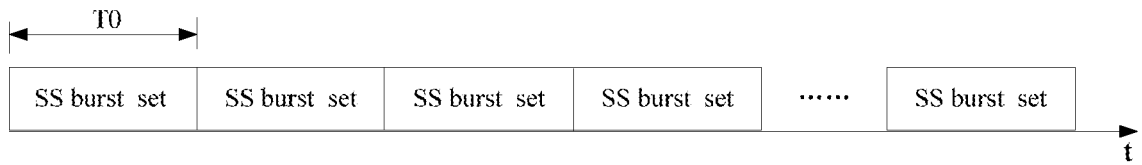
FIG. 1D is a schematic diagram illustrating transmission of an SS burst set according to an example of the present disclosure.

In 5G system, the SS burst set is transmitted periodically, as shown in FIG. 1D.

On the basis of the above technical introduction, the present disclosure provides a method of transmitting synchronization signal blocks, which is applied to a base station.

Figure 2:
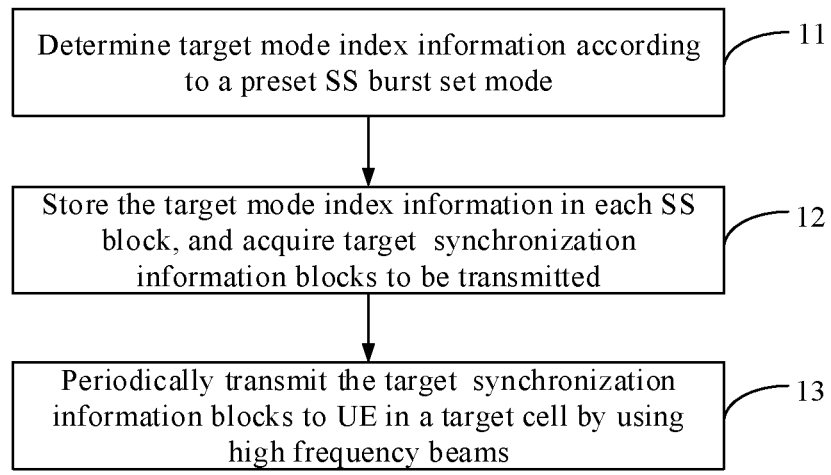
FIG. 2 is a flowchart illustrating a method of transmitting synchronization signal blocks according to an example of the present disclosure.

FIG. 2 is a flowchart illustrating a method of transmitting synchronization signal blocks according to an example. As shown in FIG. 2, the method includes:

In step 11, target mode index information is determined according to a preset synchronization information block burst set (i.e., SS burst set) mode.

In an example of the present disclosure, a plurality of SS burst set modes are available to the base station for broadcasting synchronization information blocks. When basic information of an SS burst set is determined, configuration information corresponding to each SS burst set mode varies. The basic information of an SS burst set includes: a duration of the SS burst set T0, a number of bursts included, and an SS burst transmission period T1. The configuration information of an SS burst set mode mainly includes: burst types, burst numbers of each type, and positional relationship between bursts.

Figure 3:
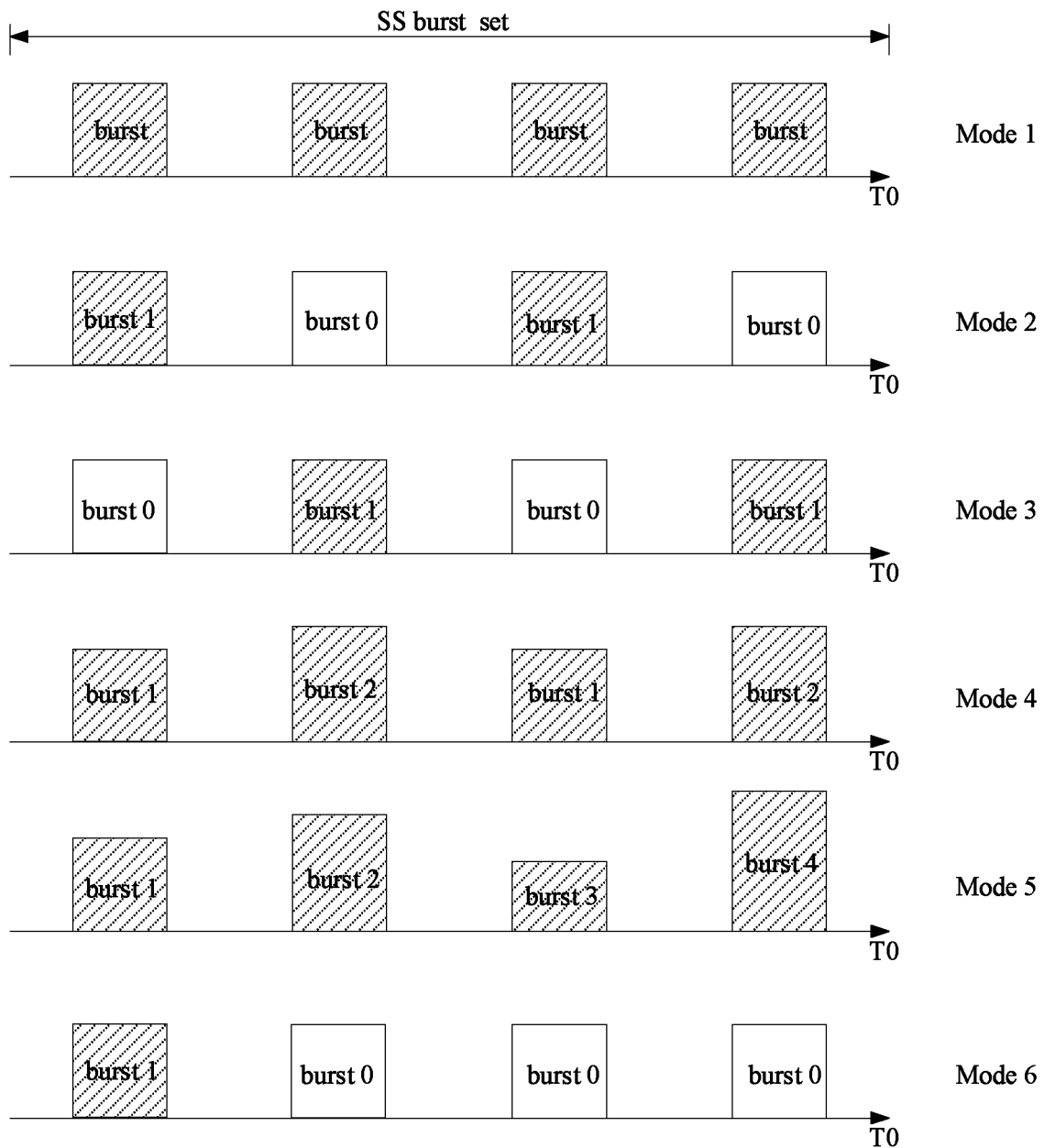
FIG. 3 is a schematic diagram illustrating structures of six SS burst set modes according to an example of the present disclosure.

FIG. 3 is a schematic diagram illustrating structures of six SS burst set modes according to an example. A base station can use one of the modes as shown in FIG. 3 to broadcast synchronization information blocks according to actual needs.

Mode 1 indicates that the base station performs four times of synchronization signal sweeping on a target cell by using SS block beams with the same frequency band within one duration of an SS burst set, for example 20 ms. In other words, within 20 ms, a stationary piece of UE in the cell is swept by the SS block beams at four different moments, where time difference between each two adjacent moments is 5 ms.

Mode 2 and Mode 3 indicate that the base station performs two times of synchronization signal sweeping on a target cell by using beams with the same frequency band within one duration of an SS burst set. In other words, within 20 ms, a stationary piece of UE in the cell is covered by SS block beams at two different moments, where the two moments are separated by 10 ms. As shown in FIG. 3, the Burst 0 in Mode 2 and Mode 3 indicates that, in its corresponding time period, no SS block is configured in a sweep beam of the base station, and such a burst can be referred to as an invalid burst.

Mode 2 differs from Mode 3 in that the valid bursts, i.e., Burst 1s, and the invalid bursts are positioned differently in time domain.

Mode 4 indicates that, within one duration of an SS burst set, SS block beams with two different frequency bands are used to perform two times of synchronization signal sweeping on a target cell. Take a 6 GHz frequency band and an 8 GHz frequency band as examples. Assuming that Burst 1 corresponds to the 6 GHz band and Burst 2 corresponds to the 8 GHz band, Mode 4 indicates: the base station sweeps the target cell (performs one time of synchronization signal sweeping) by using the SS block beams with the 6 GHz frequency band, which corresponds to Burst 1; and then, after an interval T1 of, for example, 5 ms, the base station sweeps the target cell by using the SS block beams with the 8 GHz frequency band, which corresponds to Burst 2. Then, a sweep with Burst 1 starts after another 5 ms, and a sweep with Burst 2 starts after yet another 5 ms. Each Burst 1 and Burst 2 constitute a combination which occupies half of one duration of the SS burst set, that is 10 ms.

In other words, within 20 ms, a stationary piece of UE with a working frequency band of 6 GHz in the cell, is covered at two different moments, each by one of the SS block beams in Burst 1, where the two moments are separated by 10 ms. Similarly, within 20 ms, a stationary piece of UE with a working frequency band of 8 GHz in the cell, is covered at two different moments, each by one of the SS block beams in Burst 2, where the two moments are separated by 10 ms.

Mode 5 indicates that, within one duration of the SS burst set, SS block beams with four different frequency bands are used to perform synchronization signal sweeping on a target cell. Within 20 ms, the base station performs one time of synchronization signal sweeping on the target cell by using the SS block beams with every frequency band. Similarly, a stationary piece of UE in the cell working in a certain frequency band of, for example, 6 GHz, is swept only once by the required SS block beams.

Mode 6 indicates that, within one duration of an SS burst set, SS block beams with one frequency band are used to perform one time of synchronization signal sweeping on a target cell. Similarly, a stationary piece of UE in the cell working in a corresponding frequency band, is swept only once by the SS block beam.

In an example of the present disclosure, each mode can be represented by mode index information of a preset format and size. A list of index information can be used to record the correspondence between the types of the SS burst set mode and the mode index information. For example, as shown in Table 1.

TABLE 1

| Mode | Mode 1 | Mode 2 | Mode 3 | Mode 4 | Mode 5 | Mode 6 | . . . |
|---|---|---|---|---|---|---|---|
| Mode index information | 4/4 | 2/4 | 2/4 | 2/2 | 1/1 | 1/4 | . . . |

Table 1 records the mode index information corresponding to each SS burst set mode shown in FIG. 3.

Figure 4:
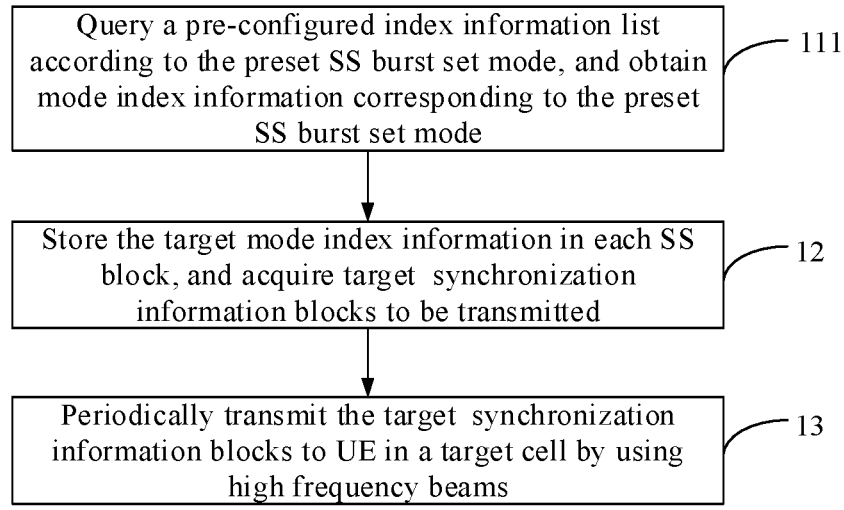
FIG. 4 is a flowchart illustrating another method of transmitting synchronization information blocks according to an example of the present disclosure.

Based on this, FIG. 4 is a flowchart illustrating another method of transmitting synchronization information blocks according to an example. As shown in FIG. 4, the foregoing step 11 includes:

In step 111, a pre-configured index information list is queried according to a preset SS burst set mode, and mode index information corresponding to the preset SS burst set mode is obtained.

It is assumed that the base station is to transmit synchronization information blocks to a target cell by using the SS burst set corresponding to Mode 1 as shown in FIG. 3. Then, by querying the Table 1 with the mode (Mode 1), the corresponding mode index information is determined as 4/4.

In step 12, the target mode index information is stored in each synchronization information block, and target synchronization information blocks to be transmitted are acquired.

In an example of the present disclosure, in each synchronization information block, the base station stores the mode index information corresponding to the SS burst set mode currently used by the base station, so that the UE is informed which mode of the SS burst set is currently used for synchronization signal transmission.

The mode index information determined by the base station has a small amount of data, and can be fully represented by only a few bits. As shown in Table 1, the mode index information, for example 4/4, can be fully represented by only 3 bits, which effectively saves radio transmission resources.

In an example of the present disclosure, storing the target mode index information in each SS block and acquiring the target SS blocks, are performed in the following manners.

In a first manner, the target mode index information is stored in a physical broadcast channel (PBCH) of each synchronization information block in the SS burst set of a preset mode.

In the LTE system, the PBCH serves to transmit important parameters of a cell, such as an MIB (Master Information Block) information used for system information configuration, and has the highest priority. Therefore, by adopting this manner, the UE can quickly acquire the synchronization information blocks, the priority of acquiring the synchronization information blocks is improved, and further, the efficiency of acquiring the synchronization information blocks is boosted.

In addition, a base station can store the target mode index information in a specified field of the PBCH, for example the 10th to 12th bits, so that the UE can quickly acquire the target mode index information, and the efficiency of acquiring the synchronization information blocks is further boosted.

In a second manner, the target mode index information is stored in other channels of each synchronization information block in the SS burst set of a preset mode.

In another example of the present disclosure, a base station can also store target mode index information in other channels, for example, the physical channel used for dynamically broadcasting cell information such as various SIBs (System Information Blocks), DBCH.

Similarly, a base station can also store the target mode index information in a specified location of other channels, so that the UE can quickly find the synchronization information block. The process will not be described here.

In step 13, the target synchronization information blocks are periodically transmitted to UE in a target cell by using high frequency beams.

After generating the target SS block, the base station loads the SS blocks in every high-frequency beam of valid bursts, which are contained in the SS burst set of a preset mode, so that SS block beams are formed. Then the base station performs synchronization signal sweeping on the target cell by using the SS block beams.

The transmission process of the target synchronization information blocks is described below with reference to a specific example. It is assumed that a base station determines that Mode 5 in FIG. 3 is to be used as the SS burst set mode for transmitting synchronization information blocks to UE in a target cell. The transmission process is as follows.

It is assumed that the burst shown in FIG. 1B is Burst 1 in Mode 5. When transmitting the first burst to the target cell, the base station first loads the mode index information of Mode 5, i.e. 1/1, into a synchronization information block and obtains block 1 shown in FIG. 1B. Then, the base station transmits the high frequency beam with a corresponding frequency band, such as 6 GHz, as beam 1 shown in FIG. 1A, in a certain direction and a preset transmission angle to the target cell, so that the UE within the coverage area corresponding to the target cell, for example UE1, can acquire the SS block 1. Similarly, all blocks starting from block 2 to block n are obtained according to the above method, and transmitted sequentially to the target cell by using the high frequency beams corresponding to the frequency band such as 6 GHz, so that all areas of the target cell are covered by the SS block beams. After 5 ms, the high frequency beams with another frequency band are used to transmit Burst 2 in Mode 5 shown in FIG. 3, and so on. Finally, Burst 4 is transmitted, which signifies the transmission of a complete SS burst set as shown in FIG. 1D.

By using the method of transmitting synchronization information blocks provided by the present disclosure, in a case where the synchronization signal transmission modes are not uniform in the 5G system, by adding the mode index information in the SS block, the UE can accurately calculate when to receive the synchronization signal, thereby quickly and accurately acquiring the required synchronization information blocks. Thus, increased device power consumption and influenced device efficiency which are caused by blind detection can be avoided.

Figure 5:
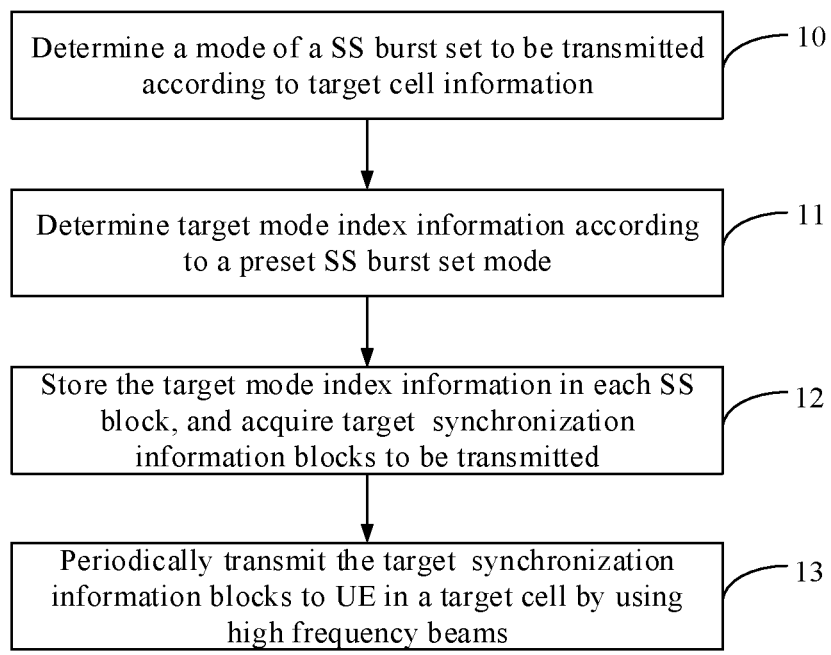
FIG. 5 is a flowchart illustrating another method of transmitting synchronization information blocks according to an example of the present disclosure.

FIG. 5 is a flowchart illustrating another method of transmitting synchronization information blocks according to an example. On the basis of the example as shown in FIG. 2, before step 11, the method further includes:

In step 10, a mode of the SS burst set to be transmitted is determined according to target cell information.

A base station can cover several cells, for example 3 cells. The distribution of UE in each cell can be identical or different. If the UE in each cell are distributed similarly or identically, the base station can use the SS burst set in the same mode for transmitting synchronization information blocks to every cell.

However, if UE is distributed differently in different cells, using SS burst set of a unified mode can result in waste of radio resources, or failure of acquiring synchronization information blocks by all UE in the cell.

On account of this, in an example of the present disclosure, before transmitting SS blocks to a target cell, the base station can first select a mode of SS burst set appropriate for the target cell according to target cell information.

Figure 6:
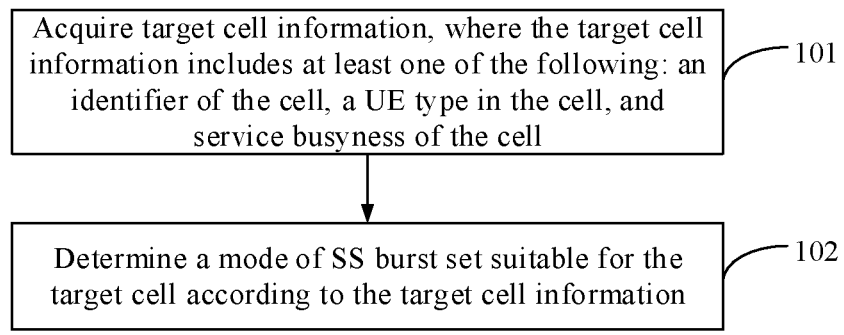
FIG. 6 is a flowchart illustrating another method of transmitting synchronization information blocks according to an example of the present disclosure.

FIG. 6 is a flowchart illustrating another method of transmitting synchronization information blocks according to an example. As shown in FIG. 6, the step 10 includes:

in step 101, target cell information is acquired, where the target cell information includes at least one of the following: an identifier of the cell, a UE type in the cell, and service busyness of the cell; and in step 102, a mode of the SS burst set suitable for the target cell is determined according to the target cell information.

In an example of the present disclosure, the cell information of a target cell includes at least one of the following: an identifier of the cell, a UE type in the cell, and service busyness of the cell.

The implementations of the step 102 can include, but are not limited to, the following situations.

In a first situation, the mode of SS burst set is determined according to the identifier of the target cell. It is assumed that the target cell information consists of the cell identifier only.

During system initialization, the base station can predetermine a list of synchronization modes according to the type of each cell. It is assumed that cells fall into two types: a cell for dedicated devices and a normal cell. During initialization, the base station designates modes of SS burst set for each cell identifier according to the cell types. Again, it is assumed that the base station covers 3 cells. The 3 cells are referred to as cell A, cell B, and cell C. If the cells A and B are normal cells, that is, communication with UE of various frequency bands is to be satisfied; and if the cell C is a cell for dedicated devices, for example for specific requirements such as security requirements, the cell only allows communication with UE of a certain frequency band, for example 6G, and denies access from UE of other working frequency bands. If the SS burst set modes that the base station can adopt are as shown in FIG. 3, the preset synchronization mode list is as shown in Table 2.

TABLE 2

|  | Cell identifier | | |
| --- | --- | --- | --- |
|  | A | B | C |
| SS burst set mode | Mode 5 | Mode 5 | Mode 1, 2, 3, or 6 |

If the identifier of the target cell is A, then by querying Table 2, it is known that the base station can use the SS burst set as represented by Mode 5 of FIG. 3 to send SS blocks to the UE in cell A.

In a second situation, the mode of SS burst set is determined according to the UE type in the target cell. In this case, the target cell information includes at least the type of UE which the cell allows access from.

After determining the target cell identifier, the base station queries cell's history information record and finds that, within a certain period of time, for example the first quarter of the year, UE with only two frequency bands is accessed to the cell. On the basis of the above information, the base station can adopt the SS burst set as represented by Mode 4 of FIG. 3 to broadcast SS blocks to the UE in the target cell in the first quarter of the year.

In a third situation, the mode of SS burst set is determined according to the service busyness of the target cell.

This case is mainly applicable where the target cell only allows access from UE with one frequency band. The base station queries cell's history information record to determine service busyness of the target cell in each time period, and then adopts different modes of SS burst set. As can be seen from Table 2, the target cell C can transmit SS blocks using Mode 1, 2, 3 or 6. It is assumed that, according to historical statistics, the service busyness of the cell C is highest during 8:00 to 12:00, moderate during 12:00 to 22:00, and lowest during 22:00~8:00. The base station can transmit SS blocks in different SS burst set modes in different time periods, as shown in Table 3.

TABLE 3

| Time period | Service busyness | Mode |
| --- | --- | --- |
| 8:00-12:00 | High | Mode 1 |
| 12:00-22:00 | Moderate | Mode 2 or 3 |
| 22:00-8:00 | Low | Mode 6 |

As shown in Table 3, the base station uses an appropriate mode of SS burst set to transmit the SS blocks according to the service busyness of the cell. In this way, the radio resources occupied by synchronization information blocks are effectively saved, the radio resources are more efficiently utilized, and the power consumption of the base station is reduced.

Correspondingly, the present disclosure also provides a method of acquiring synchronization information blocks, which is applied to UE.

Figure 7:
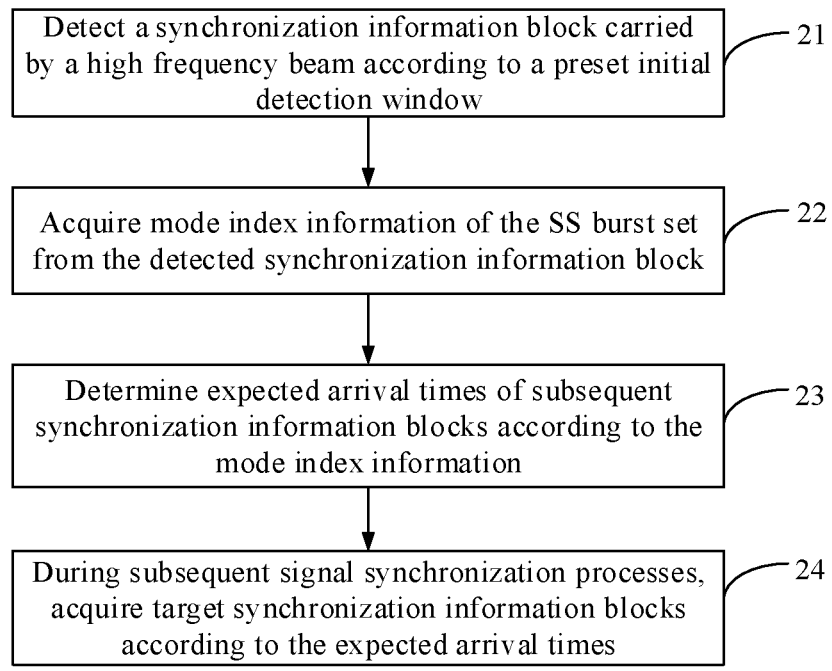
FIG. 7 is a flowchart illustrating a method of acquiring synchronization information blocks according to an example of the present disclosure.

FIG. 7 is a flowchart illustrating a method of acquiring synchronization information blocks according to an example. As shown in FIG. 7, the method includes the following steps.

In step 21, a synchronization information block carried by a high frequency beam is detected according to a preset initial detection window.

After entering the target cell, the UE enables a preset initial detection window with a duration of, for example, 5 ms, to perform a blind detection for the synchronization information blocks, so that the first synchronization information block is quickly detected.

Regarding how to determine the initial detection window of the UE, in an example of the present disclosure, the width of the initial detection window is generally determined according to a number of bursts with different frequency bands included in one SS burst set, that is, the SS burst set as represented by the Mode 5 in FIG. 3 is used to determine the initial detection window. Again, it is assumed that the duration T0 of a SS burst set is 20 ms. The SS burst set as represented by Mode 5 includes four bursts. Therefore, the width of the initial detection window can be determined as 5 ms. Considering that a certain margin is required in the actual detection, the window can be slightly larger than 5 ms and can be represented by 5 ms+.

In step 22, mode index information of the SS burst set is acquired from the detected synchronization information block.

In an example of the present disclosure, the mode index information is carried in every SS block in an SS burst set of a mode transmitted by the base station.

Therefore, after detecting the synchronization information block, according to a preset mode index information storage protocol, the UE can analyze the mode index information of the SS burst set from a preset location of the synchronization information block, for example the PBCH or other channels, or a specified field of the above preset channel.

In an example of the present disclosure, at least two manners can be adopted for acquiring the mode index information of the SS burst set from the synchronization information block.

In a first manner, after detecting the first synchronization information block, the UE acquires the mode index information of the SS burst set from the first SS block according to a preset mode index information storage protocol.

Figure 8:
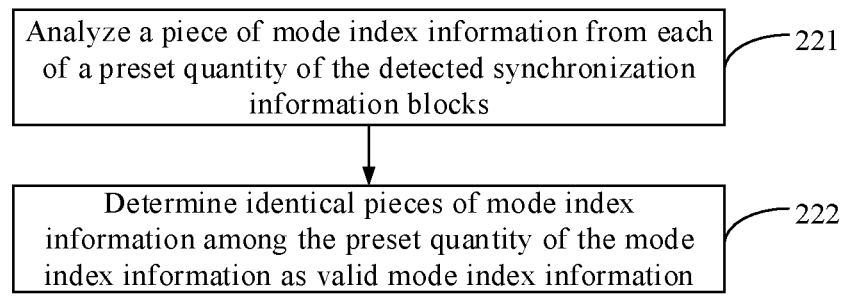
FIG. 8 is a flowchart illustrating another method of acquiring synchronization information blocks according to an example of the present disclosure.

In a second manner, the UE acquires the mode index information of the SS burst set from a plurality of detected synchronization information blocks. FIG. 8 is a flowchart illustrating another method of acquiring synchronization information blocks according to an example. As shown in FIG. 8, the foregoing step 22 includes the following steps.

In step 221, a piece of mode index information is analyzed from each of a preset quantity of the detected synchronization information blocks.

In an example of the present disclosure, the UE can continuously acquire a preset number, for example 4, of synchronization information blocks, and acquire a piece of mode index information of the SS burst set from each synchronization information block.

In step 222, identical pieces of mode index information among the preset quantity of the mode index information are determined as valid mode index information.

A total of four pieces of mode index information are acquired through the step 221. Normally, the four pieces of the mode index information are identical, but errors can occur during decoding by the UE, for example the mode index information 2/4 is analyzed into 4/4. Consequently, an inaccurate prediction of arrival times of subsequent synchronization information blocks can arise from the analyzing error. To prevent this, in an example of the present disclosure, identical pieces of mode index information among the preset quantity of mode index information after analyzing are determined as valid mode index information. In this way, the accuracy of mode index information is improved.

In step 23, expected arrival times of subsequent synchronization information blocks are determined according to the mode index information.

The mode index information can be determined by the UE either in the first manner or in the second manner.

Figure 9:
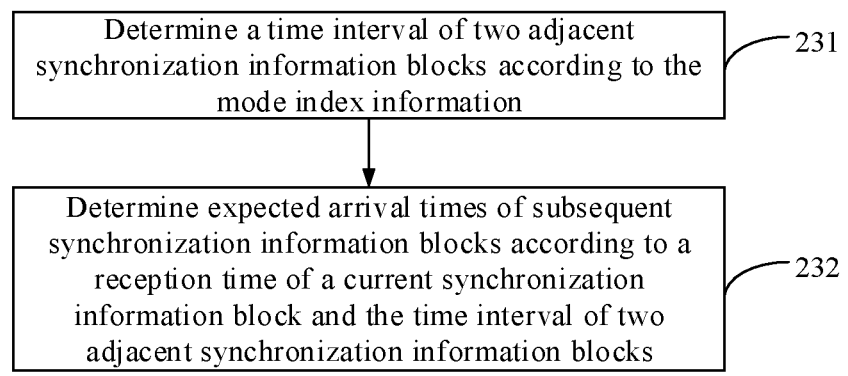
FIG. 9 is a flowchart illustrating another method of acquiring synchronization information blocks according to an example of the present disclosure.

FIG. 9 is a flowchart illustrating another method of acquiring synchronization information blocks according to an example. As shown in FIG. 9, the foregoing step 23 includes the following steps.

In step 231, a time interval between two adjacent synchronization information blocks is determined according to the mode index information.

After acquiring the mode index information, according to the mode of the SS burst set to which the SS block belongs, the UE can calculate the time interval between two adjacent SS blocks, that is, the time interval between two adjacent and identical SS bursts.

If the mode index information acquired by the UE is 1/1, which corresponds to the SS burst set as represented by Mode 5 in FIG. 3, the time interval between two adjacent and identical SS bursts is determined as 20 ms. Similarly, if the mode index information is 4/4, which corresponds to the SS burst set as represented by Mode 1 in FIG. 3, the time interval between two adjacent and identical SS bursts is 5 ms. Accordingly, if the time interval between two adjacent and identical SS bursts is represented as T2, the correspondence among the mode index information, SS burst set mode, and T2 can be listed, for example, as the following Table 4.

TABLE 4

| Mode | Mode 1 | Mode 2 | Mode 3 | Mode 4 | Mode 5 | Mode 6 |
|---|---|---|---|---|---|---|
| Mode index information | 4/4 | 2/4 | 2/4 | 2/2 | 1/1 | 1/4 |
| T2 | 5 ms | 10 ms | 10 ms | 10 ms | 20 ms | 20 ms |

In step 232, expected arrival times of subsequent synchronization information blocks are determined according to reception time of a current synchronization information block and the time interval of two adjacent synchronization information blocks.

It is assumed that at time t1, UE 1 detects a first synchronization information block, for example block 2 as shown in FIG. 1B, and the analyzed mode index information 2/4 therefrom. It is known by querying the Table 4 that, in this mode, the time interval between the arrivals of two adjacent blocks 2 at UE 1 is 10 ms. In other words, UE 1 can detect the second synchronization information block, i.e., block 2, through the detection window at time t1+10 ms. Accordingly, the times when subsequent block 2s arrive at UE 1 are calculated.

In step 24, during subsequent signal synchronization processes, target synchronization information blocks are acquired according to the expected arrival times.

It should be noted that in actual scenarios, the UE does not enable the detection window every time when a synchronization information block arrives. Instead, the UE performs signal synchronization with a preset strategy of, for example, one detection after every two synchronization information blocks. The UE can calculate opening times of the detection window according to the above information. Still taking the above-mentioned UE 1 as an example. It is assumed that the UE 1 adopts a strategy of one detection after every two synchronization information blocks. After detecting the first synchronization information block at time t1, the UE 1 can enable a synchronization signal detection window of a preset width which centering on the time t1+30 ms to detect next target synchronization information block. Similarly, the opening times of the detection window are determined according to the estimated arrival times of the target synchronization information blocks, in order to sequentially detect the target synchronization information blocks.

By using the method of acquiring synchronization information blocks provided in the examples of the present disclosure, the UE first acquires the mode index information from the detected synchronization information block, so that the UE determines the mode of SS burst set adopted by the base station for broadcasting synchronization information in the cell. Then, the time interval between every two adjacent synchronization information blocks is calculated, and the reception times of subsequent synchronization information blocks are estimated. In this way, the use of blind detection for the synchronization signal detection is avoided, radio resources of the UE are effectively saved, and the power consumption of the UE is reduced.

For the simplicity of description, all the foregoing method examples are expresses as a combination of a series of actions. However, those skilled in the art are to be aware of that the present disclosure is not limited by the sequence of the described actions, because according to the present disclosure, some steps can be performed in alternative sequences or at the same time.

Secondly, those skilled in the art are also to be aware of that the examples described in the specification are all optional examples, and the actions and modules involved are not necessarily required by the present disclosure.

The various device components, units, blocks, or portions may have modular configurations, or are composed of discrete components, but nonetheless can be referred to as "modules" in general. In other words, the "components," "portions," "modules" or "units" referred to herein may or may not be in modular forms.

Corresponding to the foregoing examples of methods implemented by applying functions, the present disclosure also provides apparatus examples implemented by applying functions and examples of corresponding terminals.

Figure 10:
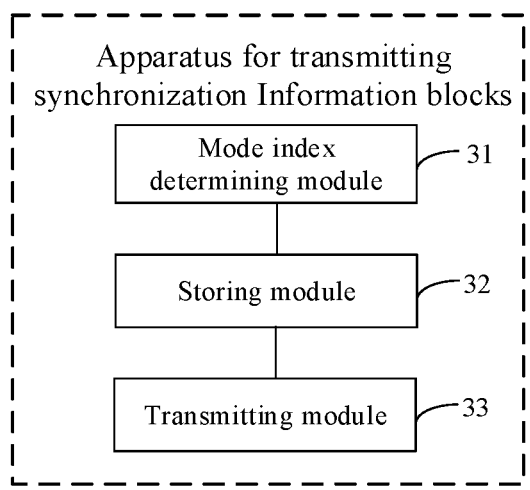
FIG. 10 is a block diagram illustrating an apparatus for transmitting synchronization information blocks according to an example of the present disclosure.

FIG. 10 is a block diagram illustrating an apparatus for transmitting synchronization information blocks according to an example. Applied to a base station, the apparatus can include:

a mode index determining module 31, configured to d target mode index information according to a preset SS burst set mode;

a storing module 32, configured to store the target mode index information in each SS block to acquire target synchronization information blocks to be transmitted; and a transmitting module 33, configured to periodically transmit the target synchronization information blocks to UE in a target cell using high frequency beams;

where each of the SS burst sets includes a first preset number of SS bursts that are periodically transmitted; and each of the SS bursts includes a second preset number of the target synchronization information blocks that are transmitted in a spatial sequence.

Figure 11:
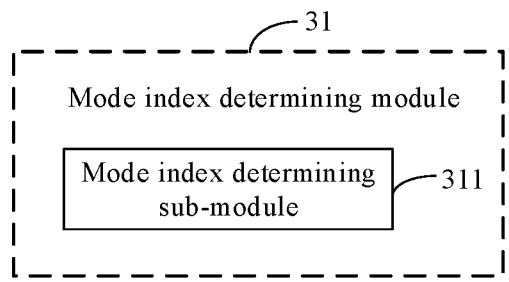
FIG. 11 is a block diagram illustrating another apparatus for transmitting synchronization information blocks according to an example of the present disclosure.

FIG. 11 is a block diagram illustrating another apparatus for transmitting synchronization information blocks according to an example. Based on the example as shown in FIG. 10, the mode index determining module 31 can comprise:

a mode index determining sub-module 311, configured to query a pre-configured index information list according to the preset SS burst set mode to acquire mode index information corresponding to the preset SS burst set mode.

Figure 12:
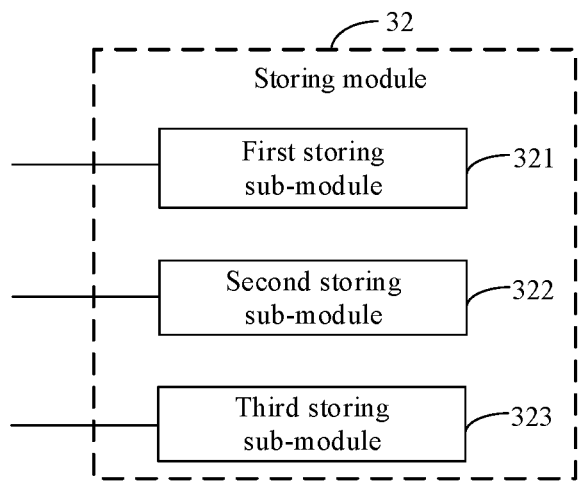
FIG. 12 is a block diagram illustrating another apparatus for transmitting synchronization information blocks according to an example of the present disclosure.

FIG. 12 is a block diagram illustrating another apparatus for transmitting synchronization information blocks according to an example. Based on the example as shown in FIG. 10, the storing module 32 can comprise one of the following sub-modules:

a first storing sub-module 321, configured to store the target mode index information in a PBCH of each synchronization information block in the SS burst set of the preset mode;

a second storing sub-module 322, configured to store the target mode index information in other channels of each synchronization information block in the SS burst set of the preset mode; and a third storing sub-module 323, configured to store the target mode index information in a designated position of the PBCH of each synchronization information block in the SS burst set of the preset mode.

Figure 13:
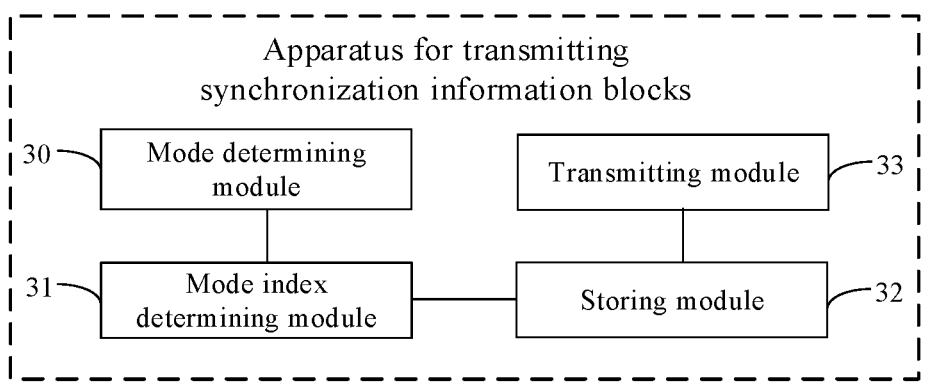
FIG. 13 is a block diagram illustrating another apparatus for transmitting synchronization information blocks according to an example of the present disclosure.

FIG. 13 is a block diagram illustrating another apparatus for transmitting synchronization information blocks according to an example. Based on the example as shown in FIG. 10, the apparatus can further include:

a mode determining module 30, configured to determine a mode of a SS burst set to be transmitted according to target cell information.

Figure 14:
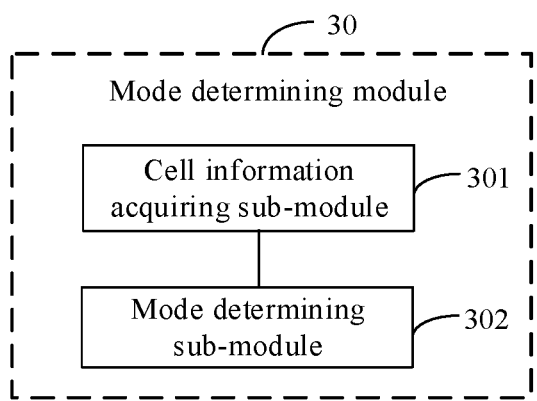
FIG. 14 is a block diagram illustrating another apparatus for transmitting synchronization information blocks according to an example of the present disclosure.

FIG. 14 is a block diagram illustrating another apparatus for transmitting synchronization information blocks according to an example. Based on the example as shown in FIG. 13, the mode determining module 30 can include:

a cell information acquiring sub-module 301, configured to acquire the target cell information, where the target cell information includes at least one of the following: an identifier of the cell, a UE type in the cell, and service busyness of the cell; and a mode determining sub-module 302, configured to determine the mode of SS burst set suitable for the target cell according to the target cell information.

Corresponding to the method of acquiring synchronization information blocks, the present disclosure also provides an apparatus for acquiring synchronization information blocks applied to UE.

Figure 15:
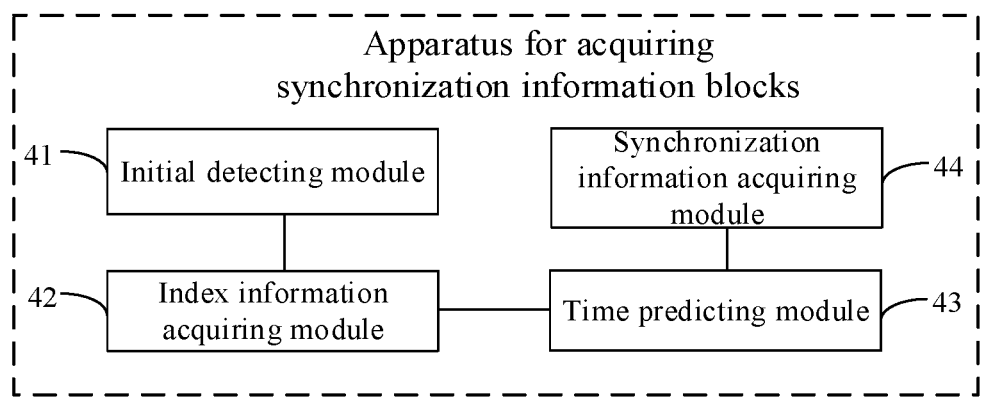
FIG. 15 is a block diagram illustrating an apparatus for acquiring synchronization information blocks according to an example of the present disclosure.

FIG. 15 is a block diagram illustrating an apparatus for acquiring synchronization information blocks according to an example. The apparatus can include:

an initial detecting module 41, configured to detect a synchronization information block carried by a high frequency beam according to a preset initial detection window;

an index information acquiring module 42, configured to acquire mode index information of an SS burst set from the detected synchronization information block;

a time predicting module 43, configured to determine expected arrival times of subsequent synchronization information blocks according to the mode index information; and a synchronization signal acquiring module 44, configured to acquire, during subsequent signal synchronization processes, target synchronization information blocks according to the expected arrival times.

Figure 16:
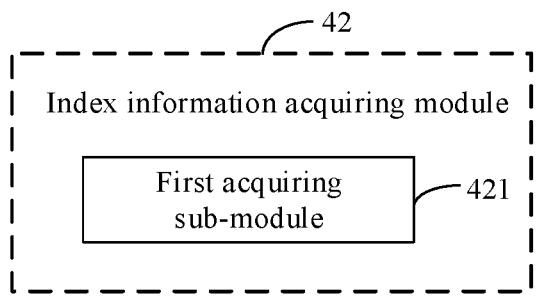
FIG. 16 is a block diagram illustrating another apparatus for acquiring synchronization information blocks according to an example of the present disclosure.

FIG. 16 is a block diagram illustrating another apparatus for acquiring synchronization information blocks according to an example. Based on the example of an apparatus as shown in FIG. 15, the index information acquiring module 42 can include:

a first acquiring sub-module 421, configured to acquire, after detecting a first synchronization information block, the mode index information of the SS burst set from the synchronization information block.

Figure 17:
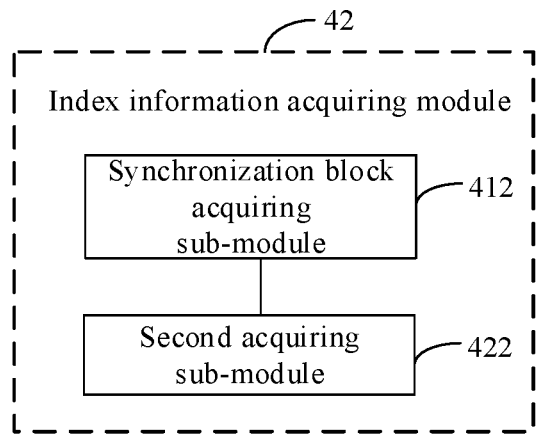
FIG. 17 is a block diagram illustrating another apparatus for acquiring synchronization information blocks according to an example of the present disclosure.

FIG. 17 is a block diagram illustrating another apparatus for acquiring synchronization information blocks according to an example. Based on the example as shown in FIG. 15, the index information acquiring module 42 can include:

a synchronization block acquiring sub-module 412, configured to analyze a piece of the mode index information from each of a preset quantity of the detected synchronization information blocks; and a second acquiring sub-module 422, configured to determine identical pieces of the mode index information among the preset quantity of the mode index information as valid mode index information.

Figure 18:
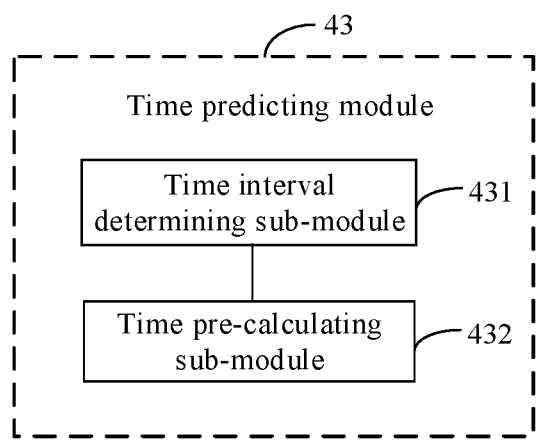
FIG. 18 is a block diagram illustrating another apparatus for acquiring synchronization information blocks according to an example of the present disclosure.

FIG. 18 is a block diagram illustrating another apparatus for acquiring synchronization information blocks according to an example. Based on the example of an apparatus as shown in FIG. 15, the time predicting module 43 can include:

a time interval determining sub-module 431, configured to determine a time interval of two adjacent synchronization information blocks according to the mode index information; and a time pre-calculating sub-module 432, configured to determine the expected arrival times of the subsequent synchronization information blocks according to a reception time of current synchronization information block and the time interval of two adjacent synchronization information blocks.

In one aspect, the present disclosure provides an apparatus for transmitting synchronization information blocks, including: a processor; a memory for storing processor executable instructions; where the processor is configured to:

determine target mode index information according to a preset SS burst set mode;

store the target mode index information in each SS block to acquire target synchronization information blocks to be transmitted; and periodically transmit the target synchronization information blocks to user equipment in a target cell using high frequency beams;

where each of the SS burst sets includes a first preset number of SS bursts that are periodically transmitted; and each of the SS bursts includes a second preset number of the target synchronization information blocks that are transmitted in a spatial sequence.

In another aspect, the present disclosure provides an apparatus for acquiring synchronization information blocks, including: a processor; a memory for storing processor executable instructions; where the processor is configured to:

detect a synchronization information block carried by a high frequency beam according to a preset initial detection window;

acquire mode index information of an SS burst set from the detected synchronization information block;

determine expected arrival times of subsequent synchronization information blocks according to the mode index information; and acquire, during subsequent signal synchronization processes, target synchronization information blocks according to the expected arrival times.

Figure 19:
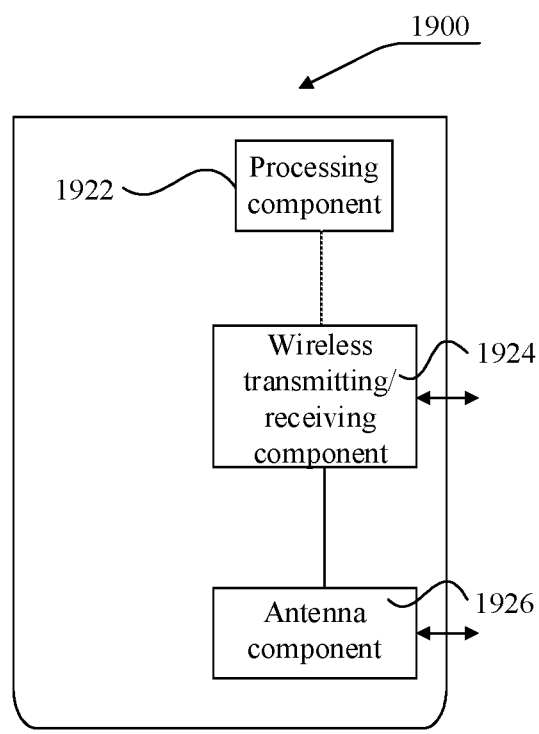
FIG. 19 is a schematic diagram illustrating a structure of an apparatus for transmitting synchronization information blocks according to an example of the present disclosure.

FIG. 19 is a schematic diagram illustrating a structure of an apparatus 1900 for transmitting synchronization information blocks according to an example. The apparatus 1900 can be provided as a base station. As shown in FIG. 19, the apparatus 1900 includes a processing component 1922, a wireless transmitting/receiving component 1924, an antenna component 1926 and a signal processing component specific to a wireless interface. The processing component 1922 can further include one or more processors.

One of the processors of the processing component 1922 is configured to:

determine target mode index information according to a preset SS burst set mode;

store the target mode index information in each SS block to acquire target synchronization information blocks to be transmitted; and periodically transmit the target synchronization information blocks to user equipment in a target cell using high frequency beams;

where each of the SS burst sets comprises a first preset number of SS bursts that are periodically transmitted; and each of the SS bursts includes a second preset number of the target synchronization information blocks that are transmitted in a spatial sequence.

Figure 20:
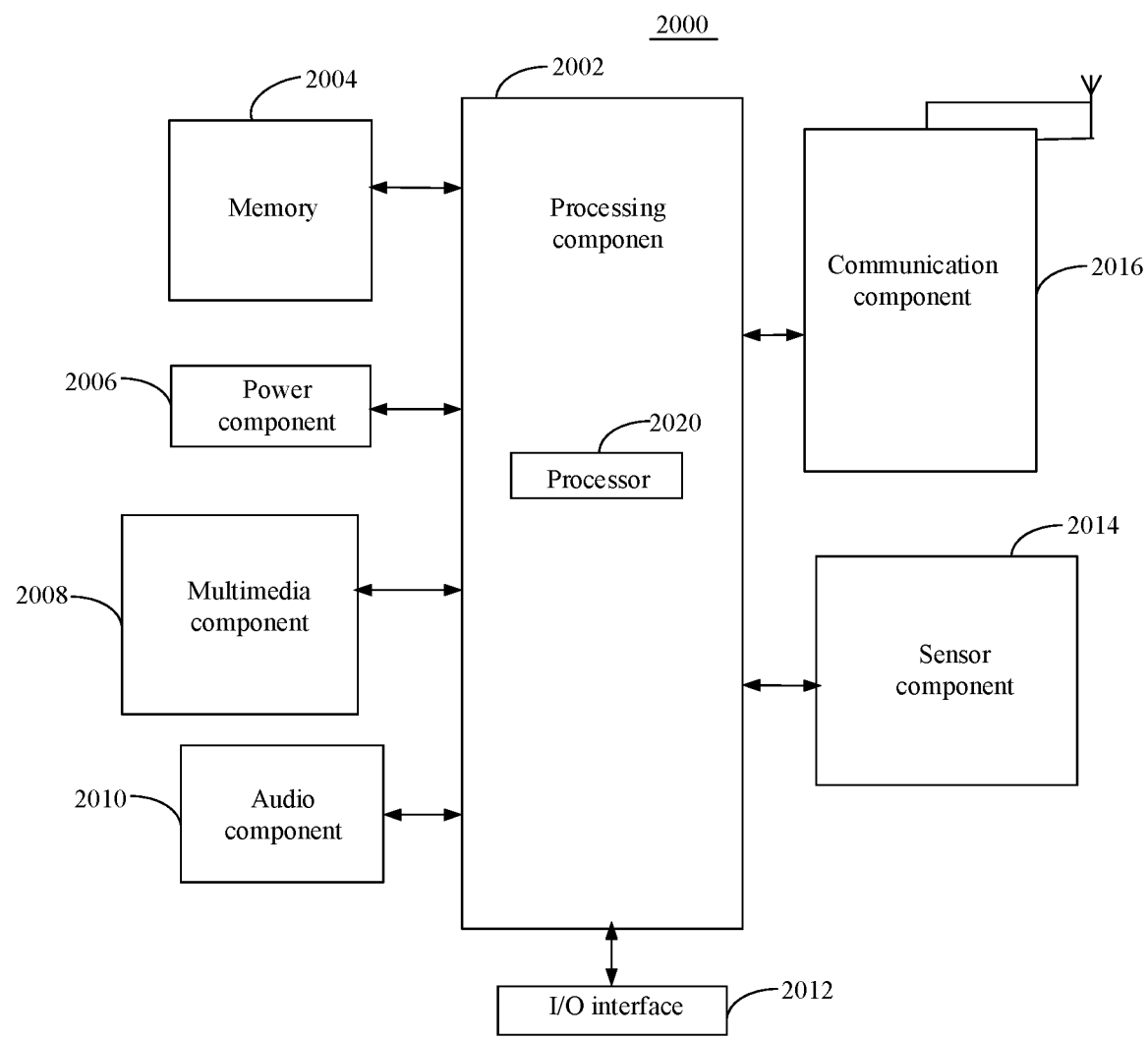
FIG. 20 is a schematic diagram illustrating a structure of an apparatus for acquiring synchronization information blocks according to an example of the present disclosure.

FIG. 20 is a schematic diagram illustrating a structure of an apparatus 2000 for acquiring synchronization information blocks according to an example. The apparatus 2000 can be UE, and can be specified as, for example, a mobile phone, a computer, a digital broadcasting terminal, a message receiving and transmitting device, a game console, a tablet device, a medical device, a fitness device, a personal digital assistant, a wearable device such as a smart watch, smart glasses, a smart bracelet, smart running shoes, etc.

Referring to FIG. 20, the apparatus 2000 can include one or more of the following components: a processing component 2002, a memory 2004, a power supply component 2006, a multimedia component 2008, an audio component 2010, an input/output (I/O) interface 2012, a sensor component 2014 and a communication component 2016.

The processing component 2002 generally controls overall operations of the apparatus 2000, such as operations associated with display, phone calls, data communications, camera operations, and recording operations. The processing component 2002 can include one or more processors 2020 to execute instructions to complete all or part of the steps of the above methods. In addition, the processing component 2002 can include one or more modules which facilitate the interaction between the processing component 2002 and other components. For example, the processing component 2002 can include a multimedia module to facilitate the interaction between the multimedia component 2008 and the processing component 2002.

The memory 2004 is to store various types of data to support the operation of the apparatus 2000. Examples of such data include instructions for any application or method operated on the apparatus 2000, contact data, phonebook data, messages, pictures, videos, and so on. The memory 2004 can be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 2006 provides power to different components of the apparatus 2000. The power supply component 2006 can include a power management system, one or more power supplies, and other components associated with generating, managing, and distributing power for the apparatus 2000.

The multimedia component 2008 includes a screen providing an output interface between the apparatus 2000 and a user. In some examples, the screen can include a Liquid Crystal Display (LCD) and a Touch Panel (TP). In some embodiments, the screen can include an OLED (organic light emitting diode) display, or other types of displays.

If the screen includes the TP, the screen can be implemented as a touch screen to receive input signals from the user. The TP can include one or more touch sensors to sense touches, swipes, and gestures on the TP. The touch sensors can not only sense a boundary of a touch or swipe, but also sense a duration and a pressure associated with the touch or swipe. In some examples, the multimedia component 2008 can include a front camera and/or a rear camera. The front camera and/or rear camera can receive external multimedia data when the apparatus 2000 is in an operating mode, such as a photographing mode or a video mode. Each of the front camera and the rear camera can be a fixed optical lens system or have focal length and optical zooming capability.

The audio component 2010 is to output and/or input an audio signal. For example, the audio component 2010 includes a microphone (MIC). When the apparatus 2000 is in an operating mode, such as a call mode, a recording mode, and a voice recognition mode, the MIC is to receive an external audio signal. The received audio signal can be further stored in the memory 2004 or sent via the communication component 2016. In some examples, the audio component 2010 further includes a speaker to output an audio signal.

The I/O interface 2012 can provide an interface between the processing component 2002 and peripheral interface modules. The above peripheral interface modules can include a keyboard, a click wheel, buttons and so on. These buttons can include, but are not limited to, a home button, a volume button, a starting button and a locking button.

The sensor component 2014 includes one or more sensors to provide status assessments of various aspects for the apparatus 2000. For example, the sensor component 2014 can detect the on/off status of the apparatus 2000, and relative positioning of component, for example, the component is a display and a keypad of the apparatus 2000. The sensor component 2014 can also detect a change in position of the apparatus 2000 or a component of the apparatus 2000, a presence or absence of the contact between a user and the apparatus 2000, an orientation or an acceleration/deceleration of the apparatus 2000, and a change in temperature of the apparatus 2000. The sensor component 2014 can include a proximity sensor to detect the presence of a nearby object without any physical contact. The sensor component 2014 can further include an optical sensor, such as a Complementary Metal-Oxide-Semiconductor (CMOS) or Charged Coupled Device (CCD) image sensor which is used in imaging applications. In some examples, the sensor component 2014 can further include an acceleration sensor, a gyroscope sensor, a magnetic sensor, a pressure sensor, or a temperature sensor.

The communication component 2016 is to facilitate wired or wireless communication between the apparatus 2000 and other devices. The apparatus 2000 can access a wireless network that is based on a communication standard, such as Wi-Fi, 2G or 3G, or a combination thereof. In an example, the communication component 2016 receives a broadcast signal or broadcast-associated information from an external broadcast management system via a broadcast channel. In an example, the communication component 2016 further includes a Near Field Communication (NFC) module to facilitate short-range communications. For example, the NFC module can be implemented based on a Radio Frequency Identification (RFID) technology, an Infrared Data Association (IrDA) technology, an Ultra-Wideband (UWB) technology, a Bluetooth® (BT) technology and other technologies.

In an example, the apparatus 2000 can be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is also provided a non-volatile and non-transitory computer-readable storage medium including instructions, such as a memory 2004 including instructions executable by the processor 2020 of the apparatus 2000 to perform the acquisition of synchronization information blocks. For example, the non-volatile computer readable storage medium is a ROM, a random-access memory (RAM), a CD-ROM, a magnetic tape, a floppy disk, or an optical data storage device.

The operations described in this disclosure can be implemented as operations performed by a data processing apparatus on data stored on one or more computer-readable storage devices or received from other sources. The apparatuses can be implemented with hardware including processing circuits, software programs, or a combination thereof.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized. Some other embodiments of the present disclosure can be available to those skilled in the art upon consideration of the specification and practice of the various embodiments disclosed herein.

The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims. In the present disclosure, it is to be understood that the terms "bottom," "inside," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In the description of the present disclosure, the terms "some embodiments," "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method of transmitting synchronization information blocks, applied to a base station, the method comprising:
   determining target mode index information according to a preset synchronization information block burst set (SS burst set) mode, wherein the target mode index information indicates the preset SS burst set mode, and the target mode index information comprises information on a number of times that synchronization signal bursts (SS bursts) with a same band are transmitted within one duration of an SS burst set and a number of times that SS bursts with the same band are comprised within one duration of the SS burst set;
   storing the target mode index information in each synchronization information block (SS block) to acquire target synchronization information blocks to be transmitted; and
   periodically transmitting the target synchronization information blocks to user equipment in a target cell using high frequency beams;
   wherein each of the SS burst sets comprises a first preset number of synchronization signal bursts that are periodically transmitted; and each of the SS bursts includes a second preset number of the target synchronization information blocks that are transmitted in a spatial sequence.

2. The method according to claim 1, wherein the determining the target mode index information according to the preset SS burst set mode comprises:
   querying a pre-configured index information list according to the preset SS burst set mode to acquire mode index information corresponding to the preset SS burst set mode.

3. The method according to claim 1, wherein the storing the target mode index information in each synchronization information block (SS block) to acquire the target synchronization information blocks are performed by at least one of:
   storing the target mode index information in a physical broadcast channel (PBCH) of each synchronization information block in the SS burst set of the preset mode;
   storing the target mode index information in other channels of each synchronization information block in the SS burst set of the preset mode; or
   storing the target mode index information in a designated position of the PBCH of each synchronization information block in the SS burst set of the preset mode.

4. The method according to claim 1, wherein prior to the determining the target mode index information according to the preset SS burst set mode, the method further comprises:
   determining a mode of a SS burst set to be transmitted according to target cell information.

5. The method according to claim 4, wherein the determining the mode of the SS burst set to be transmitted according to the target cell information comprises:
acquiring the target cell information, wherein the target cell information comprises at least one of the following: an identifier of the cell, a user equipment type in the cell, and service busyness of the cell; and
determining the mode of SS burst set suitable for the target cell according to the target cell information.

6. A method of acquiring synchronization information blocks, applied to user equipment, the method comprising:
detecting a synchronization information block carried by a high frequency beam according to a preset initial detection window;
acquiring mode index information of an SS burst set from the detected synchronization information block, wherein the mode index information indicates a SS burst set mode, and the mode index information comprises information on a number of times that SS bursts with a same band are transmitted within one duration of an SS burst set and a number of times that SS bursts with the same band are comprised within one duration of the SS burst set;
determining expected arrival times of subsequent synchronization information blocks according to the mode index information; and
during subsequent signal synchronization processes, acquiring target synchronization information blocks according to the expected arrival times.

7. The method according to claim 6, wherein the acquiring the mode index information of the SS burst set from the detected synchronization information block comprises:
after detecting a first synchronization information block, acquiring the mode index information of the SS burst set from the synchronization information block.

8. The method according to claim 6, wherein the acquiring the mode index information of the SS burst set from the detected synchronization information block comprises:
analyzing a piece of the mode index information from each of a preset quantity of the detected synchronization information blocks; and
determining identical pieces of the mode index information among the preset quantity of the mode index information as valid mode index information.

9. The method according to claim 7, wherein the determining the expected arrival times of the subsequent synchronization information blocks according to the mode index information comprises:
determining a time interval of two adjacent synchronization information blocks according to the mode index information; and
determining the expected arrival times of the subsequent synchronization information blocks according to a reception time of current synchronization information block and the time interval of two adjacent synchronization information blocks.

10. The method according to claim 8, wherein the determining the expected arrival times of the subsequent synchronization information blocks according to the mode index information comprises:
determining a time interval of two adjacent synchronization information blocks according to the mode index information; and
determining the expected arrival times of the subsequent synchronization information blocks according to a reception time of current synchronization information block and the time interval of two adjacent synchronization information blocks.

11. An apparatus for transmitting synchronization information blocks, comprising:
a processor; and
a memory for storing processor executable instructions;
wherein the processor is configured to:
determine target mode index information according to a preset SS burst set mode, wherein the target mode index information indicates the preset SS burst set mode, and the target mode index information comprises information on a number of times that SS bursts with a same band are transmitted within one duration of an SS burst set and a number of times that SS bursts with the same band are comprised within one duration of the SS burst set;
store the target mode index information in each SS block to acquire target synchronization information blocks to be transmitted; and
periodically transmit the target synchronization information blocks to user equipment in a target cell using high frequency beams;
wherein each of the SS burst sets comprises a first preset number of SS bursts that are periodically transmitted; and each of the SS bursts includes a second preset number of the target synchronization information blocks that are transmitted in a spatial sequence.

12. The apparatus according to claim 11, wherein the determining the target mode index information according to the preset SS burst set mode comprises:
querying a pre-configured index information list according to the preset SS burst set mode to acquire mode index information corresponding to the preset SS burst set mode.

13. The apparatus according to claim 11, wherein the storing the target mode index information in each synchronization information block (SS block) to acquire the target synchronization information blocks are performed by at least one of:
storing the target mode index information in a physical broadcast channel (PBCH) of each synchronization information block in the SS burst set of the preset mode;
storing the target mode index information in other channels of each synchronization information block in the SS burst set of the preset mode; or
storing the target mode index information in a designated position of the PBCH of each synchronization information block in the SS burst set of the preset mode.

14. The apparatus according to claim 11, wherein prior to the determining the target mode index information according to the preset SS burst set mode, the method further comprises:
determining a mode of a SS burst set to be transmitted according to target cell information.

15. The apparatus according to claim 14, wherein the determining the mode of the SS burst set to be transmitted according to the target cell information comprises:
acquiring the target cell information, wherein the target cell information comprises at least one of the following: an identifier of the cell, a user equipment type in the cell, and service busyness of the cell; and
determining the mode of SS burst set suitable for the target cell according to the target cell information.

16. An apparatus for acquiring synchronization signal blocks, the apparatus comprising:
a processor; and
a memory for storing processor executable instructions;
wherein the processor is configured to:
   detect a synchronization information block carried by a high frequency beam according to a preset initial detection window;
   acquire mode index information of an SS burst set from the detected synchronization information block, wherein the mode index information indicates a SS burst set mode, and the mode index information comprises information on a number of times that SS bursts with a same band are transmitted within one duration of an SS burst set and a number of times that SS bursts with the same band are comprised within one duration of the SS burst set;
   determine expected arrival times of subsequent synchronization information blocks according to the mode index information; and
   acquire, during subsequent signal synchronization processes, target synchronization information blocks according to the expected arrival times.

17. The apparatus according to claim 16, wherein the acquiring the mode index information of the SS burst set from the detected synchronization information block comprises:
   after detecting a first synchronization information block, acquiring the mode index information of the SS burst set from the synchronization information block.

18. The apparatus according to claim 16, wherein the acquiring the mode index information of the SS burst set from the detected synchronization information block comprises:
   analyzing a piece of the mode index information from each of a preset quantity of the detected synchronization information blocks; and
   determining identical pieces of the mode index information among the preset quantity of the mode index information as valid mode index information.

19. The apparatus according to claim 17, wherein the determining the expected arrival times of the subsequent synchronization information blocks according to the mode index information comprises:
   determining a time interval of two adjacent synchronization information blocks according to the mode index information; and
   determining the expected arrival times of the subsequent synchronization information blocks according to a reception time of current synchronization information block and the time interval of two adjacent synchronization information blocks.

20. The apparatus according to claim 18, wherein the determining the expected arrival times of the subsequent synchronization information blocks according to the mode index information comprises:
   determining a time interval of two adjacent synchronization information blocks according to the mode index information; and
   determining the expected arrival times of the subsequent synchronization information blocks according to a reception time of current synchronization information block and the time interval of two adjacent synchronization information blocks.

* * * * *